J. STUBBERS.
HYDROCARBON HEATING AND LIGHTING SYSTEM.
APPLICATION FILED NOV. 30, 1908.
926,514.
Patented June 29, 1909.
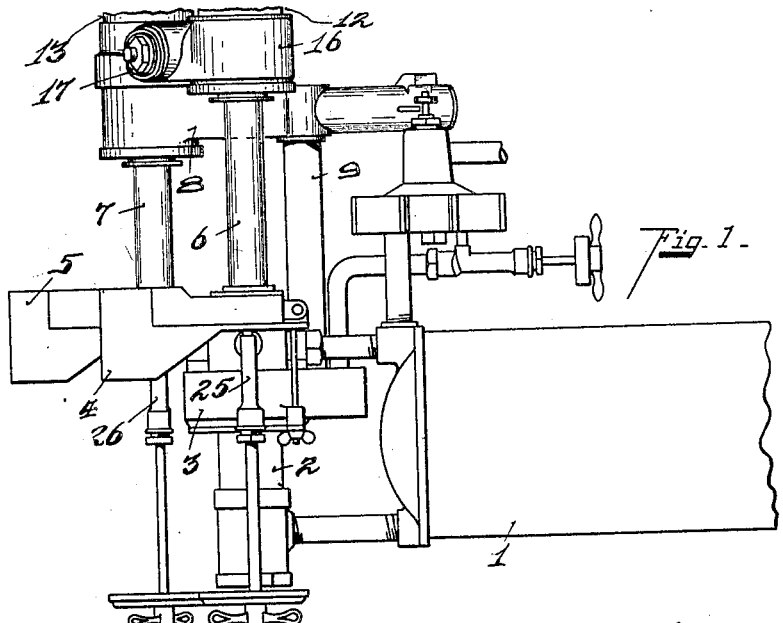
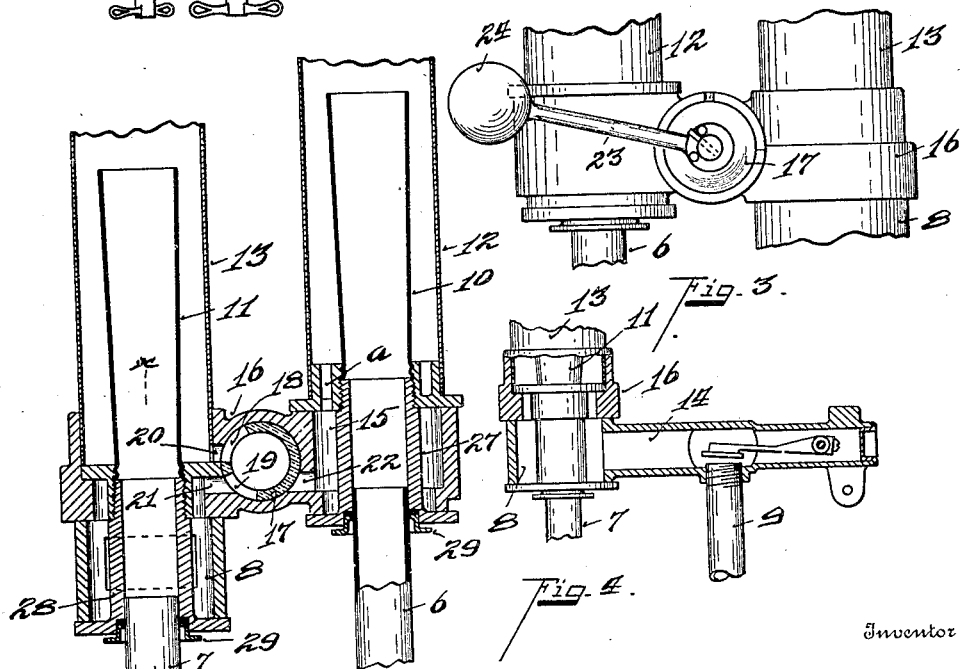

UNITED STATES PATENT OFFICE.

JOSEPH STUBBERS, OF COVINGTON, KENTUCKY, ASSIGNOR TO THE INCANDESCENT LIGHT & STOVE COMPANY, OF CINCINNATI, OHIO, A CORPORATION OF OHIO.

HYDROCARBON HEATING AND LIGHTING SYSTEM.

No. 926,514.  Specification of Letters Patent.  Patented June 29, 1909.

Application filed November 30, 1908. Serial No. 465,219.

*To all whom it may concern:*

Be it known that I, JOSEPH STUBBERS, a citizen of the United States, residing at Covington, in the county of Kenton and State of Kentucky, have invented certain new and useful Improvements in Hydrocarbon Heating and Lighting Systems, of which the following is a specification.

My invention relates to a hydro-carbon lighting and heating system, or, to any hydro-carbon system in which one generator supplies two lines of pipe.

The invention has particular reference to that type of apparatus in which the vapor from the generator is conducted into two independent air mixers, delivering the prepared gases into two independent service pipes, one of which supplies the lighting and the other the heating system. In this type of apparatus the gas for operating the sub-burner is received through a by-pass from the service pipe. It is often desirable to use one of the service pipes alone, or, to shift from one system to the other.

It is the object of my invention to provide mechanism enabling either of the service pipes to supply the sub-burner and to prevent the escape of gas from the service pipe which is in commission into the service pipe which is out of commission. My invention also enables the operator to shift from one pipe system to another without extinguishing the generating flame.

To this end my invention consists in conduits and controlling valve mechanism between the service pipes and the by-pass pipe supplying the sub-burner.

The features of the invention are more fully set forth in the description of the accompanying drawings, forming a part of this specification, in which:—

Figure 1 is a side elevation of a generator employing two independent air mixers, with my improvement applied, for controlling the gas to the sub-burner. Fig. 2 is an enlarged central vertical section through the sub-flame burner gas controlling mechanism. Fig. 3 is a rear elevation of the valve. Fig. 4 is a reduced section on line $x$, $x$, Fig. 2.

To illustrate the application of the invention, I have shown it in connection with a well-known type of apparatus, in which:—1 is the gasolene tank and 2 the generator connected at the top and bottom.

3 is the sub-burner for the generator. 4 represents the air mixer for one of the pipe systems, and 5 is the air mixer for the other pipe system, both mixers receiving the vapor generated from the generator.

6, 7, represent the pipes for conducting the mixed gases respectively from the mixers 4, 5.

8 is a gas chamber supplied from service pipes 6 or 7 through valve mechanism to be later described.

14 represents a passage from chamber 8, and 9 is a valve controlled pipe leading from passage 14 to supply the sub-burner.

The pipes 6, 7, have upward extensions 10, 11, and each is surrounded by a pipe 12, 13, respectively, which may be called the service pipes, leading off to two different systems.

15 represents an annular gas chamber formed in the casting 16 under the service pipe 12 and connected therewith by a passage $a$. The service pipes 12, 13, are connected together at the base by a casting 16, in which is placed a two-way valve 17, having the ports 18, 19. The service pipe 13 has the port 20, adapted to communicate with the port 18. 21 represents a port, adapted to communicate with chamber 8 and the valve port 19; and the chamber 15 has the port 22, adapted to communicate with the valve port 19; when these latter ports are in communication the port 18 will also be in communication with port 21.

From this description the operation will be readily understood. The gases flow from the pipes 10, 11, into the service pipes 12, 13, respectively. In the position shown in Fig. 2, service pipe 13 is in and pipe 12 out of commission. The gas from the service pipe 13 will pass through ports 20, 18, 19, 21, into chamber 8 and thence through passage 14, by-pass 9, to the sub-burner 3, the chamber 15 being shut off from communication with the by-pass, so that no gas from the service pipe 12 can have access to the sub-burner, and more particularly so that no gas from the service pipe 13 can escape into the service pipe 12 when the pipe 12 is not in use. In like manner when the position of the valve 17 is reversed, the gas from the service pipe 12 will pass into the chamber 15, and thence through ports 22, 19, 18, 21, into the chamber 8, and through the by-pass of the sub-burner, the service pipe 12, which is in commission, being entirely cut off from the service pipe 13, which is out of commission. I am thus enabled to use either service pipe independently, supplying the sub-burner from the service pipe which is in commission, and effectually preventing the gas from one service pipe gaining access to the other pipe, so that they can be used independently with perfect safety, and they can also be used conjointly.

Preferably, I provide the valve 17 with a handle 23, having the weighted end 24, so as to definitely give the valve the two positions of control already described, and rendering it impossible to be left in the half way position. The valve is so constructed, that in mid-way position both chambers 8 and 15 are in communication with the by-pass 9, so that, if it is desired to change from one system to the other, the gas supply to the sub-burner will not be cut off in shifting the valve.

25 represents the needle valve for admitting vapor to the mixer 4, and 26 a similar valve for mixer 5.

The extensions 10, 11, are connected to the pipes 6, 7, respectively, by means of the thimbles 27, 28, and 29 represents the stuffing box caps. This construction enables the pipes 6, 7, to be moved upwardly into these thimbles to disconnect the same from their mixers.

Having described my invention, I claim:—

1. In a hydro-carbon lighting or heating system, a generator, a sub-burner therefor, two service pipes, adapted to be independently or conjointly used, a gas chamber, a valve mechanism for alternatively connecting either service pipe with the gas chamber, and a supply pipe from said chamber to said sub-burner, substantially as described.

2. In a hydro-carbon heating or lighting system, a generator, a sub-burner therefor, two service pipes, adapted to be independently or conjointly used, and means for alternatively connecting either service pipe with said sub-burner, substantially as described.

3. In a hydro-carbon heating or lighting system, a generator, a sub-burner therefor, two service pipes, adapted to be independently or conjointly used, means for alternatively connecting either service pipe with said sub-burner, said means shutting off the service pipe in commission from communication with the service pipe out of commission, substantially as described.

4. In a hydro-carbon heating or lighting system, a generator, a sub-burner therefor, two service pipes, adapted to be independently or conjointly used, gas conduits connecting said service pipes with the sub-burner, and a valve mechanism controlling said conduits and adapted to connect either service pipe with the sub-burner, shutting off the pipe in commission from communication with the pipe out of commission, substantially as described.

5. In a hydro-carbon heating or lighting system, a generator, a sub-burner therefor, two service pipes, adapted to be independently or conjointly used, gas conduits connecting said service pipes with the sub-burner, and a valve mechanism controlling said conduits and adapted to connect either service pipe with the sub-burner, shutting off the pipe in commission from communication with the pipe out of commission, said valve being constructed to be shifted from one position to the other without shutting off communication with the sub-burner, substantially as described.

6. In a hydro-carbon heating or lighting system, a generator, a sub-burner therefor, two service pipes, adapted to be independently or conjointly used, a gas chamber communicating with each of the service pipes, a supply pipe from one of the chambers to the sub-burner, a gas conduit and a controlling valve adapted to place either service pipe in communication with the chamber from which the sub-flame burner supply pipe leads, said valve being constructed to shut off the supply pipe in commission from one which is out of commission, substantially as described.

7. In a hydro-carbon heating or lighting system, a generator, a sub-burner therefor, two service pipes, adapted to be independently or conjointly used, a supply pipe for the sub-burner, gas conduits and a valve adapted to connect the sub-burner supply pipe with either service pipe alternatively, shutting off the pipe in commission from that out of commission, substantially as described.

In testimony whereof, I have hereunto set my hand.

JOSEPH STUBBERS.

Witnesses:
 OLIVER B. KAISER,
 S. BECK.